Patented Jan. 31, 1939

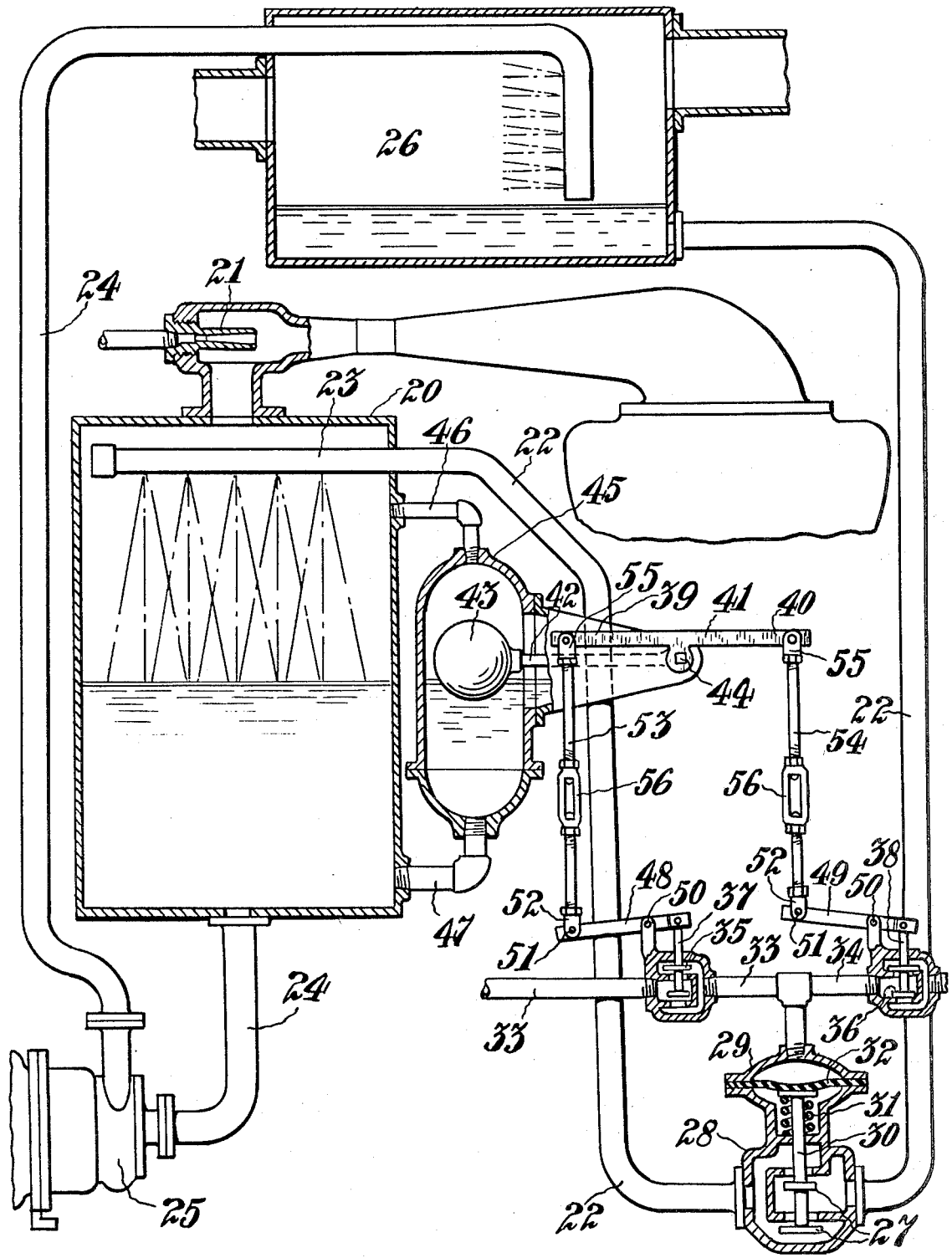

2,145,602

UNITED STATES PATENT OFFICE 2,145,602

CONTROLLING APPARATUS

John Kirgan, Easton, Pa., assignor to Ingersoll-Rand Company, Jersey City, N. J., a corporation of New Jersey Application June 23, 1937, Serial No. 149,816

1 Claim. (Cl. 137—68)

This invention relates to hydraulic systems, but more particularly to controlling apparatus of the float and valve type for controlling the flow of liquid to a vessel.

Although not limited to such use, the invention is particularly applicable to refrigerating systems of the water-vapor type for controlling the flow of water to the evaporator thereof. In systems of this character, water is partially vaporized and cooled in the evaporator by exposure to the action of a vacuum maintained in the evaporator by a steam ejector or centrifugal compressor. The cooled water is removed from the evaporator by a pump.

Several factors make it necessary to maintain substantially constant water level in the evaporator: first, due to the low pressure, a static head of water on the pump must be constantly assured; second, the water must be fully exposed to the action of the vacuum to assure maximum cooling of the water, and this is generally effected by dropping the water in fine particles through the vaporization space in the evaporator; and third, the water must be prevented from entering the ejector or compressor to avoid erosion thereof. Each of these factors must be considered if efficient operation of the system is to be maintained. In many float and valve constructions, however, the action is oftentimes slow and considerable variations in the level of the liquid may occur.

It is accordingly an object of this invention to assure quick and accurate control of the water level in a vessel.

Other objects will be in part obvious and in part pointed out hereinafter.

In the accompanying drawing, the figure is an elevation, partly in section, of a refrigerating system embodying controlling apparatus constructed in accordance with the practice of the invention.

Referring more particularly to the drawing, 20 designates the evaporator vessel of a water-vapor refrigerating system and 21 is the vapor evacuator for creating vacuum in the vessel. A conduit 22 enters the vessel near the top thereof and forms a spray header 23 in the vessel for delivering water or other liquid thereto.

The water vaporizes and cools as it falls from the header owing to its exposure to the action of the vacuum in the vessel, and is drawn off from the vessel 20 through a conduit 24 into a pump 25. From the pump the conduit 24 leads into a unit, such as an air conditioner 26, where the refrigerating effect of the water is utilized.

The conduit 22 may lead from any suitable source of water or it may return warmed water from the unit 26 to the evaporator vessel 20.

In accordance with the practice of the invention, an automatically actuated valve 27 is interposed in the conduit 22 to control the flow of water to the vessel 20. A well known diaphragm type of pressure actuated valve is shown, the parts of the valve being enclosed in casings 28 and 29 and comprising the usual ports and seats for the valve, a valve stem 30, a spring 31 engaging the stem to urge the valve toward closed position and a diaphragm 32 engaging the stem and adapted to be acted upon by a pressure fluid in opposition to the force of spring 30 to urge the valve toward open position.

A pipe 33 leads to the casing 29 from a source (not shown) of suitable pressure fluid, for example water, compressed air or the like and connections are provided for controlling the amount and pressure of the fluid flowing to the casing in accordance with variations in the level of the liquid in the vessel 20.

To this end, the pipe 33 branches, one branch leading to the casing 29 and another branch 34 serving to convey the pressure fluid to waste or to other places of use. Suitable valving devices serve to control the amount and pressure of the fluid supplied to the valve through pipe 33 and the amount of fluid draining through the pipe 34. In the form shown, a balance valve 35 of well known type is interposed in the pipe 33 and a like valve 36 is interposed in the branch pipe 34. The valves 35 and 36 are preferably of a type which may be used with any pressure fluid irrespective of its density.

The stems 37 and 38 of the valves 35 and 36, respectively, extend outside of the casings of these valves and are pivotally connected through systems of levers to opposite ends 39 and 40, respectively, of a bar 41. The bar 41 is in turn fixedly connected at 44 between its ends by suitable means to the arm 42 of a float 43 and rotates about the fulcrum 44 of the arm.

The float and arm are enclosed in a cage 45 connected at top and bottom by pipes 46 and 47, respectively, to the side of the vessel 20. These pipes open from vertically spaced points in the vessel into the cage to admit water and vapor thereto and the liquid level in the cage will thereby be the same as in the vessel 20.

The bar 41 is essentially a rocker arm and preferably extends in opposite directions from its pivotal point 44, so that one end rises as the other falls.

The systems of levers between each end of the bar 41 and the corresponding valve 35 or 36 are separate and each adjustable. The systems comprise levers 48 and 49 pivotally attached to the valve stems 37 and 38, respectively, each lever being suitably fulcrumed intermediate its ends, as at 50, and pivotally connected at 51 to a clevis 52. These clevises receive threaded ends of rods 53 and 54, respectively, and the rods are further pivotally connected at their other ends by additional clevises 55 to the respective ends of the bar 41. Interposed in each rod 53 and 54 is a turn-buckle 56 for varying the effective length of the rod.

The operation of the controlling apparatus is as follows: Let it be assumed that at the desired liquid level in the tank, the valves are in the positions shown. Water, or other fluid, under proper pressure will be more or less throttled by the valve 35 and will act on the diaphragm 32 to hold the valve 27 in the desired position.

If then for any reason there should be an increase in the flow of water through the conduit 22 such as might cause filling of the vessel 20 and consequent cessation of refrigerating effect and erosion of the vapor evacuator, the float 43 will rise and cause clockwise rotation of the bar 41 to elevate the rod 53 and lower the rod 54. The lever 48 will then rotate clockwise about its fulcrum 50 and cause the stem 37 to move the valve 35 toward closed position. The lever 49, on the other hand, will rotate counterclockwise about its fulcrum 50 and cause the stem 38 to move the valve 36 toward open position.

This conjoint action of the valves 35 and 36 in response to the movement of the float causes an immediate decrease of pressure on the diaphragm 32 and the spring 31 urges the valve 27 toward closed position. In this instance, the valve 35 acts to throttle the pressure fluid flowing through pipe 33 to reduce its pressure, and the valve 36 acts to relieve the existing pressure on the diaphragm 32.

When the opposite condition occurs, such as may cause draining of the vessel 20 and consequent loss of head on the pump 25, the valve 35 moves toward open position to increase the pressure of the fluid acting on the diaphragm 32, and the valve 36 moves toward closed position to prevent relief of this pressure.

Any small change in liquid level causes a relatively large change in the pressure acting on the valve and this is due in part to the sensitivity of the valves 35 and 36 and in part to the fact that one valve opens as the other closes. The action is much quicker than when a single valve is employed and is also more accurate. Only a very small change can occur in the level of the liquid in the vessel 20 before the valve 27 is adjusted to compensate for the change.

The depth of water in the vessel 20 may be varied somewhat by adjusting the turn-buckles 56 to vary the relative lengths of rods 53 and 54, thereby altering the timed relationship of the operation of valves 35 and 36. If, for example, the effective length of the rod 53 is increased, the liquid will be maintained at higher level in the vessel 20, while if the effective length of rod 54 is increased, a lower level will result.

I claim:

The combination with a vessel having a liquid therein, a cage communicating with the vessel and having a liquid therein at the same level as the liquid in the vessel, a float in the cage to rise and fall with variations in the liquid level, a lever connected to the float, a bar connected to the lever and movable thereby, a conduit for admitting liquid to the vessel, a pressure actuated valve in the conduit, a pipe for conveying pressure fluid to the pressure actuated valve, a valve in said pipe to control the quantity and pressure of fluid conveyed by said pipe to the pressure actuated valve, a second pipe for conveying pressure fluid away from the pressure actuated valve, a second valve in said second pipe to control the quantity and pressure of fluid conveyed away from said pressure actuated valve by said second pipe, controlling levers for each said first and second valves, and rods adjustable in length to connect each end of said bar to the respective controlling lever whereby moving of said float will vary the amount of pressure fluid conveyed to and away from said pressure actuated valve to thereby control the quantity of liquid admitted to the vessel.

JOHN KIRGAN.